July 1, 1969  V. DUHEM  3,452,969
PROCESS AND DEVICE FOR DISCHARGING A PONDERABLE MATTER
AT THE OUTLET OF A ROTARY APPARATUS
Filed April 12, 1967

INVENTOR
VICTOR DUHEM
BY
Stevens, Davis, Miller & Mosher
ATTORNEYS

United States Patent Office 3,452,969
Patented July 1, 1969

3,452,969
PROCESS AND DEVICE FOR DISCHARGING A PONDERABLE MATTER AT THE OUTLET OF A ROTARY APPARATUS
Victor Duhem, Avon, France, assignor to Venot-Pic, Avon, France
Filed Apr. 12, 1967, Ser. No. 630,259
Claims priority, application France, May 9, 1966, 60,853
Int. Cl. F27d 3/00
U.S. Cl. 263—32                                 10 Claims

ABSTRACT OF THE DISCLOSURE

A process and apparatus for subjecting an aggregate ponderable material to a heat-exchange, wherein a bulk quantity of the material is divided into separate portions which are simultaneously conducted along distinct enclosures of different length and then discharged therefrom at a plurality of spaced apart discharge points as separate batches of the material are fed into the apparatus.

---

The improvement of the present invention resides in the feature of the tube-like members being of different lengths whereby their discharge ends terminate in respective different radial planes.

The present invention, therefore, is directed to an improved process and apparatus for advancing respective equal or unequal fractions of a ponderable material (one having substantial weight) along a rotary heat-exchange drum whereby said separate fractions of material may be discharged from said drum and collected at respective axially displaced discharge points along the drum length.

The process consists fundamentally of dividing the flow of matter discharged at the downstream end of a revolving body, such as the cylindrical shell of a heat exchanger, in order to collect the divided parts separately.

The division is carried out in the body itself of the apparatus where the product is separated into N parts before leaving the body; at the outlet it suffices to recover the product in a corresponding number of collectors.

The apparatus for the application of the process consists of a revolving body equipped, within or at the downstream end, with a number N of elements composed of independent closed enclosures which form an integral whole with the revolving body or are attached to it by bolting or any other known method of fixing.

These enclosures are arranged in such a way that each of them takes an equal, or unequal, part of the flow of the matter. In the first case, all the enclosures are similar, in dimensions and in shapes, whilst in the second case they differ.

The number, the dimensions and the shape of the enclosures are not limited; they depend on the degree of division and on the characteristics of the product treated.

The upstream end of each enclosure is equipped with a scoop means for feeding an aggregate material into the respective enclosures or tube-like members. The material may first pass through helical elements before being picked up by the scoop means.

The enclosures may be fitted internally with flow blades or any other elements for aiding the forward movement or the heat exchange.

The length of each enclosure depends on the relationship between its discharge point an dits feed scoop. According to an alternative construction of the invention the enclosures can comprise, at the determined discharge points, openings equipped with grids which allow a size classification to be made.

In order that the invention may be readily understood, certain particularities and preferred embodiments are described below, by way of example, in conjunction with the accompanying drawings, in which.

Figure 1:
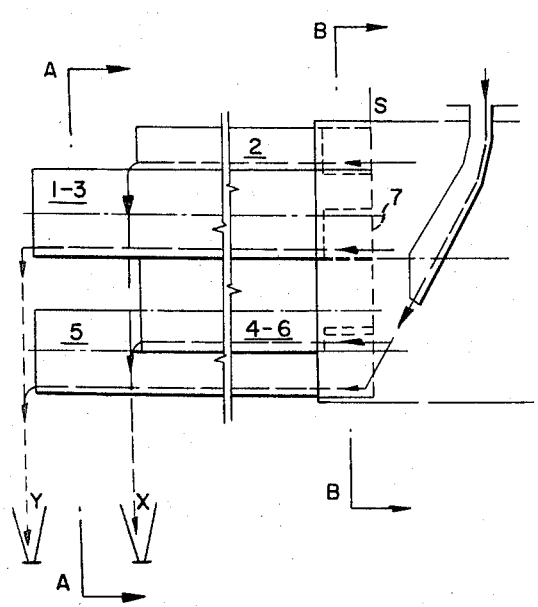
FIGURE 1 is a top plan view of a heat-exchanger drum according to the invention having a total of six enclosures arranged to discharge respective fractions of a material at two axially displaced points.

The disclosed apparatus operates as follows:

With reference to FIGURE 1, respective fractions of the material to be subjected to a heat-exchange are fed into each of the enclosures 1 to 6 by respective scoops 7 whose function is to facilitate the feeding of the material into said enclosures.

The axes of the enclosures 1 to 6 all lie along a circle of radius R (FIGURE 2) while the scoops 7 all lie along a common line S (FIGURE 1). By virtue of the rotation of the drum assembly, a material (not shown) contained in a cylindrical shell is fed tangentially into the scoops 7 and is advanced axially therealong until it enters the enclosures 1 to 6 after about 200 to 300 degrees of rotation of said assembly.

Figure 2:
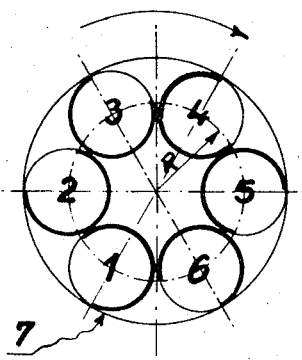
FIGURE 2 is a view taken along line A—A in FIGURE 1 and shows the scoop means for feeding the material into the respective enclosures.
Figure 4:
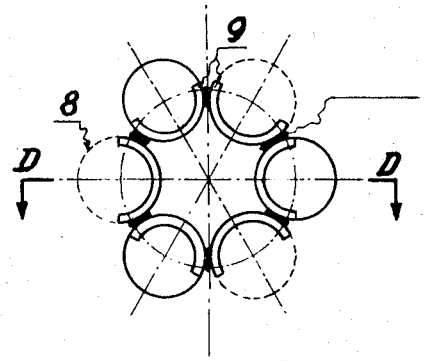
FIGURE 4 is a view taken along line B—B in FIGURE 3 and shows the position of the grids; and, FIGURE 5 is a view taken along line D—D in FIGURE 4 and shows sills at positions diametrically opposite the grids.

According to the embodiment of FIGURES 1 and 2, the enclosures 1 to 6 discharge the material in two separate and equal parts, the enclosures being similar in all respects excepting as to their lengths, three of the enclosures discharging on the plane X and the other three on the plane Y. For each discharge point there are thus three enclosures of the same length.

Figure 3:
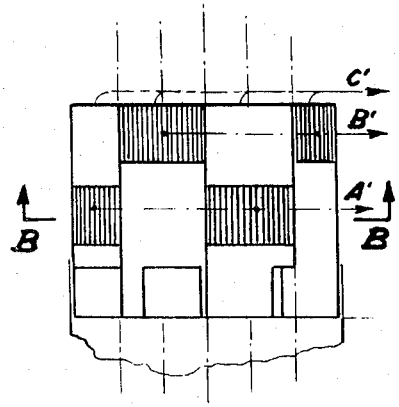
FIGURE 3 is a top plan view of a heat-exchanger drum according to this invention having a total of six enclosures provided with grids for classifying the material according to particulate size.
Figure 5:
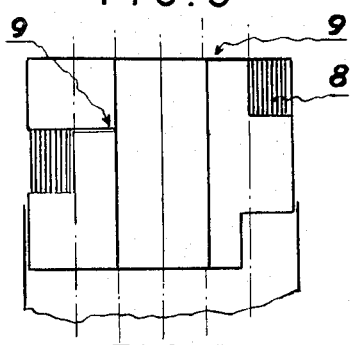

In the embodiment shown in FIG. 3, the enclosures are equipped with size classification grids 8 which divide the material into two underflow parts A' and B' passing through the grids, the overflow being discharged at the end of the enclosures C'. In this case, the sills 9 are diametrically opposed to the grids in such a way as to prevent portions of the material which should normally pass through the grids from being carried on to the end discharge point.

It is evident that modifications may be made to the device described and illustrated without going beyond the scope of the invention. Thus, for instance, in the example illustrated in FIG. 1 the enclosures are placed in a castellated arrangement but it is also possible to adopt any other arrangement.

What is claimed is:
1. A process for exchanging heat between an aggregate material and a heat-exchange medium, comprising:
 (a) feeding respective portions of said material into one end of each of respective separate non-intercommunicating elongate enclosures;
 (b) advancing said portions separately from each other along the length of the enclosures while simultaneously subjecting the material of each of said portions to a heat-exchange; and,
 (c) discharging the material from each enclosure at either of at least two longitudinally spaced apart discharge points whereby the total amount of material fed into one end of the enclosures is discharged and collected as either of only one of at least two separate batches.

2. The process of claim 1, wherein at least two of said portions of material are advanced along their corresponding enclosures for different periods of time relative to each other.

3. The process of claim 2, wherein said at least two portions of material are advanced along corresponding enclosures of different length.

4. The process of claim 1, wherein said material is discharged in the form of at least two batches of equal quantity.

5. The process of claim 1, wherein said material is discharged in the form of at least two batches of unequal quantity.

6. The process of claim 1, wherein said material is fed into six enclosures as six separate portions and discharged therefrom in the form of at least two separate batches.

7. An apparatus for subjecting an aggregate ponderable material to a heat-exchange, comprising: a heat-exchange assembly rotatable along a generally horizontal axis, said assembly comprising a plurality of elongate separate enclosures each having an inlet end and a discharge end, the respective enclosures being of at least two different lengths whereby their corresponding discharge ends are at different axially spaced apart points along the axis of said assembly.

8. The apparatus of claim 7, size classification grids positioned within said enclosures for separating an aggregate material into particles according to size.

9. The apparatus of claim 7, including a scoop means at the inlet end of each closure for scooping up a portion of aggregate material from a bulk quantity thereof and feeding said portion into a corresponding enclosure as said assembly rotates.

10. The apparatus of claim 7, including means within each enclosure for promoting flow of an aggregate material towards the discharge end of each enclosure.

References Cited

UNITED STATES PATENTS

| | | | |
|---|---|---|---|
| 1,652,168 | 12/1927 | Fasting | 263—32 |
| 2,836,299 | 5/1958 | Johnson | 209—270 |
| 2,846,070 | 8/1958 | Schlebusch | 209—238 |
| 3,145,162 | 8/1964 | Caipen | 209—238 X |

JOHN J. CAMBY, *Primary Examiner.*